United States Patent

Craig, Jr.

[11] Patent Number: 6,060,790
[45] Date of Patent: May 9, 2000

[54] SOLAR ARRAY SWITCHING UNIT

[75] Inventor: Calvin L. Craig, Jr., Parker, Colo.

[73] Assignee: Lockheed Martin Corporation, Bethesda, Md.

[21] Appl. No.: 09/028,634

[22] Filed: Feb. 24, 1998

[51] Int. Cl.[7] .................................................. H02J 1/00
[52] U.S. Cl. ........................... 307/71; 307/80; 307/85
[58] Field of Search ................... 307/71, 80, 81, 307/85, 86, 112, 116, 125, 149; 320/101, 117; 323/906; 136/292

[56] References Cited

U.S. PATENT DOCUMENTS

| | | | |
|---|---|---|---|
| 3,636,539 | 1/1972 | Gaddy | 340/210 |
| 4,175,249 | 11/1979 | Gruber | 323/15 |
| 4,328,456 | 5/1982 | Suzuki et al. | 320/7 |
| 4,513,167 | 4/1985 | Brandstetter | 136/244 |
| 4,742,243 | 5/1988 | Zabar et al. | 307/81 |
| 4,814,631 | 3/1989 | Jackson | 307/53 |
| 5,121,046 | 6/1992 | McCullough | 320/16 |
| 5,352,931 | 10/1994 | Yang | 307/81 |
| 5,394,075 | 2/1995 | Ahrens et al. | 320/39 |
| 5,413,293 | 5/1995 | Gomberg et al. | 244/166 |
| 5,500,052 | 3/1996 | Horiuchi et al. | 136/244 |

*Primary Examiner*—Jeffrey Gaffin
*Assistant Examiner*—Peter Zura
*Attorney, Agent, or Firm*—Holme Roberts & Owen LLP

[57] ABSTRACT

A solar array switching (SASU) unit (22) according to the present invention includes a control system (24), a solar cell array (26) and switch circuits (28). The SASU unit (22) is associated with a power card (30) for receiving an output from the array (26). The array (26) has a number (0.5Y) of rows (38) each of which includes a pair of cell strings (42) separated by one of the switch circuits (28). Each of the strings (42) includes a number (X) of cells in electrical series. The SASU (22) switches the array (26) between a short string configuration where the array (26) effectively includes Y strings of X length, and a long string configuration where the array (26) effectively includes 0.5Y strings of 2X length. The SASU (22) thereby facilitates the use of solar power for space missions where solar intensity, operating temperature or other factors vary significantly.

28 Claims, 5 Drawing Sheets

SOLAR ARRAY SWITCHING UNIT

This invention was made with funding under NASA Contract No. NA51-1260 the United States Government may have certain rights invention.

FIELD OF THE INVENTION

The present invention relates, in general, to spacecraft power systems and, in particular, to a solar power system for use in space missions where solar intensity, operating temperature, or other relevant factors vary over time. The invention is particularly useful for deep space missions, e.g., missions that extend beyond the orbit of Mars.

BACKGROUND OF THE INVENTION

Due to space and mass limitations, spacecraft used in extended space missions must generally either generate their own power, e.g., through solar collectors, or use nuclear power. Solar powered spacecraft typically use a number of large area solar panels that are deployed once the spacecraft is in flight. Each panel generally includes a two-dimensional array of solar cells wherein each solar cell has an active area for converting sunlight to electricity and a pair of electrodes, e.g., a front electrode and a back electrode. A number of such cells may be arranged in electrical series in a "string", for example, by connecting a positive electrode of one cell (e.g, the front electrode) to the negative electrode (e.g, back electrode) of an adjacent cell. By connecting cells in such a string, an increased voltage can be achieved for the spacecraft electrical system. A number of these strings can be connected in parallel to provide an increased current.

Such solar power systems have proved to be highly reliable for many missions and have the ability to generate power indefinitely. However, solar power systems are problematic for deep space missions such as planetary probes that venture beyond Mars' orbit or proposed probes for approaching comets in highly elliptical orbits. In particular, the system parameters of voltage and current can vary dramatically in such missions. The current generated by a solar cell is dependent upon the solar intensity incident on the cell. Accordingly, the current produced by a given cell or string of cells varies in proportion to the square of the distance from the sun, and reaches significantly reduced levels, relative to near earth currents, when a spacecraft passes beyond the Mars orbit. On the other hand, as temperature decreases, solar cell voltage increases. Consequently, the voltage of a given cell or string of cells increases with increasing distance from the sun.

Because of these variations, solar power has not been viewed as a viable option for certain deep space missions. Such missions have therefore been designed for nuclear power. However, nuclear power systems have become problematic due to perceived safety issues and political complications.

There have been some proposals for reconfigurable solar systems, i.e., systems where solar cells or cell groups can alternatively be arranged in a series or a parallel configuration. However, these proposals generally either i) have been complicated in terms of non-generator elements (e.g., switches, sensors, etc.) required, thereby increasing cost, size and mass; or, ii) have provided only a very limited ability to vary system parameters through reconfiguration. As a result, it is apparent that such proposals have not fully addressed the needs of a range of deep space missions.

SUMMARY OF THE INVENTION

The present invention is directed to a method and apparatus for providing solar power for deep space missions. The invention allows for reconfiguration of a solar array to provide suitable voltage and current over the course of a mission for a variety of deep space and other applications. The solar array provides substantial reconfiguration flexibility with minimal non-generator elements, thereby reducing cost, size and mass requirements. Moreover, the method of the invention allows for convenient scaling of solar power system design to most efficiently meet mission requirements. The invention thereby allows solar power to be used in a variety of applications where nuclear power might otherwise be required, and allows for conventional, lightweight and inexpensive solar cell options for certain applications where exotic, more massive or expensive solar cells and materials might otherwise be thought necessary.

According to one aspect of the present invention, a reconfigurable solar power system is provided for spacecraft applications. The system includes at least one solar array having at least four strings of solar cells and a mechanism for switching the array between a first configuration wherein a first of the strings is arranged in parallel with each of the other strings and a second configuration wherein the first string is arranged in series with at least one of the other strings. It will be appreciated that a much larger number of strings can be employed, and that additional strings can be paired or otherwise interconnected in series as desired. The array can thereby be reconfigured to maximize power output. In this regard, where the lengths of the strings provide adequate voltage for a given operating environment, the four strings can be arranged in parallel to provide increased current. Alternatively, where operating temperatures reduce voltage, at least two of the strings can be arranged in series to enhance voltage output.

According to another aspect of the present invention, a spacecraft solar power system with substantial reconfiguration flexibility is provided. The system includes at least one solar cell array and a configuration mechanism for varying the number of cell groups in the array. Each of the cell groups includes at least one string of a plurality of solar cells connected in series without intervening switches. The configuration mechanism switches the array between a first configuration and a second configuration wherein the array includes at least twice as many cell groups in the first configuration as in the second configuration. For example, the array may include a number of paired strings, where the strings of any pair can be switched between a parallel or series arrangement, thereby allowing the number of cell groupings in the array to be varied by a factor of two. The system thus has significant cell grouping flexibility to address varying needs over the course of a mission.

According to a further aspect of the present invention, a solar array switching unit is provided that allows for enhanced configuration options with minimal non-generator elements, e.g., switches. The unit includes an array and a configuration system for switching the array between first and second configurations. The first and second configurations preferably include an enhanced voltage configuration where a larger number of the array cells are arranged in series in a lengthened string, and an enhanced current configuration where a larger number of strings (e.g., shortened strings) are arranged in parallel. In any event, the second configuration referenced above includes more strings in parallel than the first configuration. The configuration further includes a number of switches (e.g., relay switches or circuits with control logic) for switching between the first and second configurations, where the number of switches is less than the number of strings arranged in parallel in the second configuration. The unit thus provides substantial configuration flexibility with minimal non-generator elements, thereby reducing complexity, cost and mass requirements.

According to a still further aspect of the present invention, a method is provided for use in designing a configurable solar array system to meet mission requirements. The configurable array includes a variable cell string length and a variable parallel arrangement of strings. The variable cell string length includes a minimized string length and the variable parallel arrangement includes a maximized parallel arrangement. The array designing method includes the steps of determining the minimized string length in relation to a high power portion of the mission and determining the maximized parallel arrangement in relation to the minimized string length as well as a power requirement and solar intensity of a second portion of the mission. For example, for a mission where distance from the sun varies greatly, the minimized string length (i.e., number of cells in the string) may be selected to provide adequate voltage/power at a point in the mission where power is a particular concern, e.g., where a number of systems are up and running. The maximized parallel arrangement (i.e., number of strings in parallel) may be used where providing adequate current is a particular concern, e.g., at an aphelion of the mission. Thus, the designer may determine: i) that a string length of X is necessary to meet a particular power requirement of one portion of the mission, and ii) that Y strings (of length X) are necessary to meet the current requirements of another portion of the mission. This designing method therefore allows for convenient scaling of solar array design based on mission requirements so as to minimize solar panel size and mass.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

In order to fully illustrate the invention and its advantages, the invention is set forth below in the context of an exemplary deep space mission. The invention is particularly useful in such a context because of the widely varying distance of the spacecraft from the sun and attendant variations in solar intensity or flux and temperature. These variations, in turn, result in variations in the current and voltage parameters of a solar array on a per cell basis. While such a mission therefore provides an appropriate context for consideration of the invention, it will be appreciated that the invention is more broadly applicable to a variety of missions where current and voltage may vary as a result of temperature, solar flux or other factors.

Figure 1:
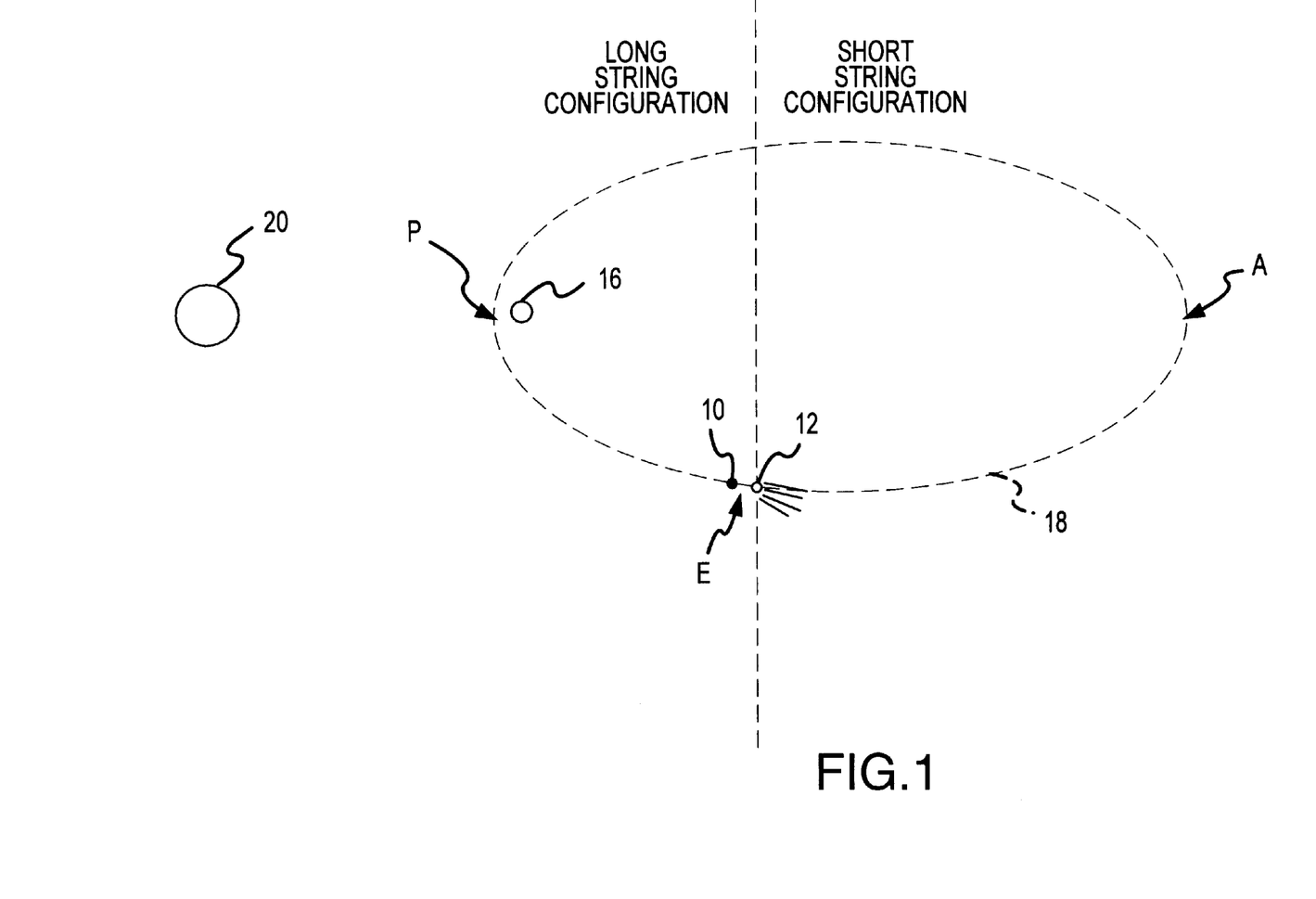
FIG. 1 is a diagram illustrating one example of a deep space mission in connection with which the present invention may be used.

A particular deep space mission is illustrated in FIG. 1. The illustrated mission involves an encounter between a spacecraft 10 and a comet 12 (at encounter point E) for scientific purposes, e.g., to perform measurements or capture particles from the comet's tail for return to earth 16. As illustrated, the spacecraft orbit 18 entails significant variation in the distance between the spacecraft and the sun 20. In this regard, the spacecraft 10 is inserted into the orbit 18 from earth 16 or low earth orbit (at P) at a sun-relative distance of about 0.98 AU, which is also the perihelion of orbit 18. The encounter E occurs at about 1.86 AU, and the orbit's aphelion occurs at about 2.72 AU.

This orbit 18 results in substantial variation in the solar flux and temperature experienced by the craft's solar panels. In particular, the maximum temperature and flux are experienced at P where the solar intensity is about 1363 W/m$^2$ and the temperature is about 79° C. By contrast, at A, the solar intensity is only about 184 W/m$^2$ and the temperature is about −61° C. Consequently, for high efficiency silicon solar cells, it is anticipated that the cell current at P will be about 1000 mA and the cell voltage may be below about 400 mV. At A, the cell current may drop to near 100 mA, whereas the voltage may rise to above 600 mV. As a result of these variations in cell parameters, it will be appreciated that the conventional solar panel design process would be somewhat complicated, perhaps requiring consideration of nuclear alternatives or oversizing of the solar panels to accommodate a worst case scenario (with an accompanying mass penalty) or requiring the use of more expensive and heavier solar cell alternatives, such as GaAs cells, in order to mitigate temperature related efficiency variations.

Figure 2:
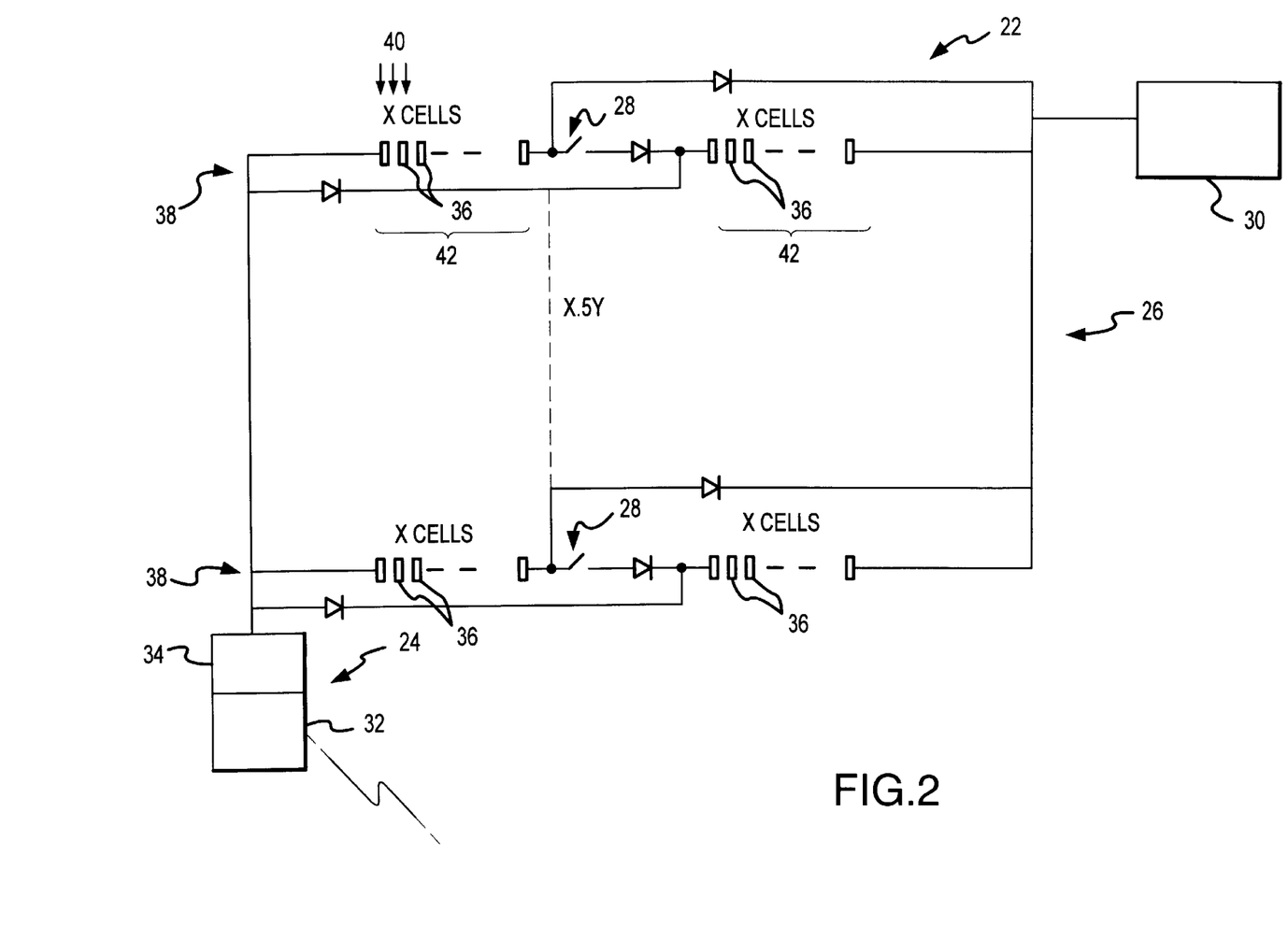
FIG. 2 is a block diagram of a solar array switching unit in accordance with the present invention.
Figure 3:
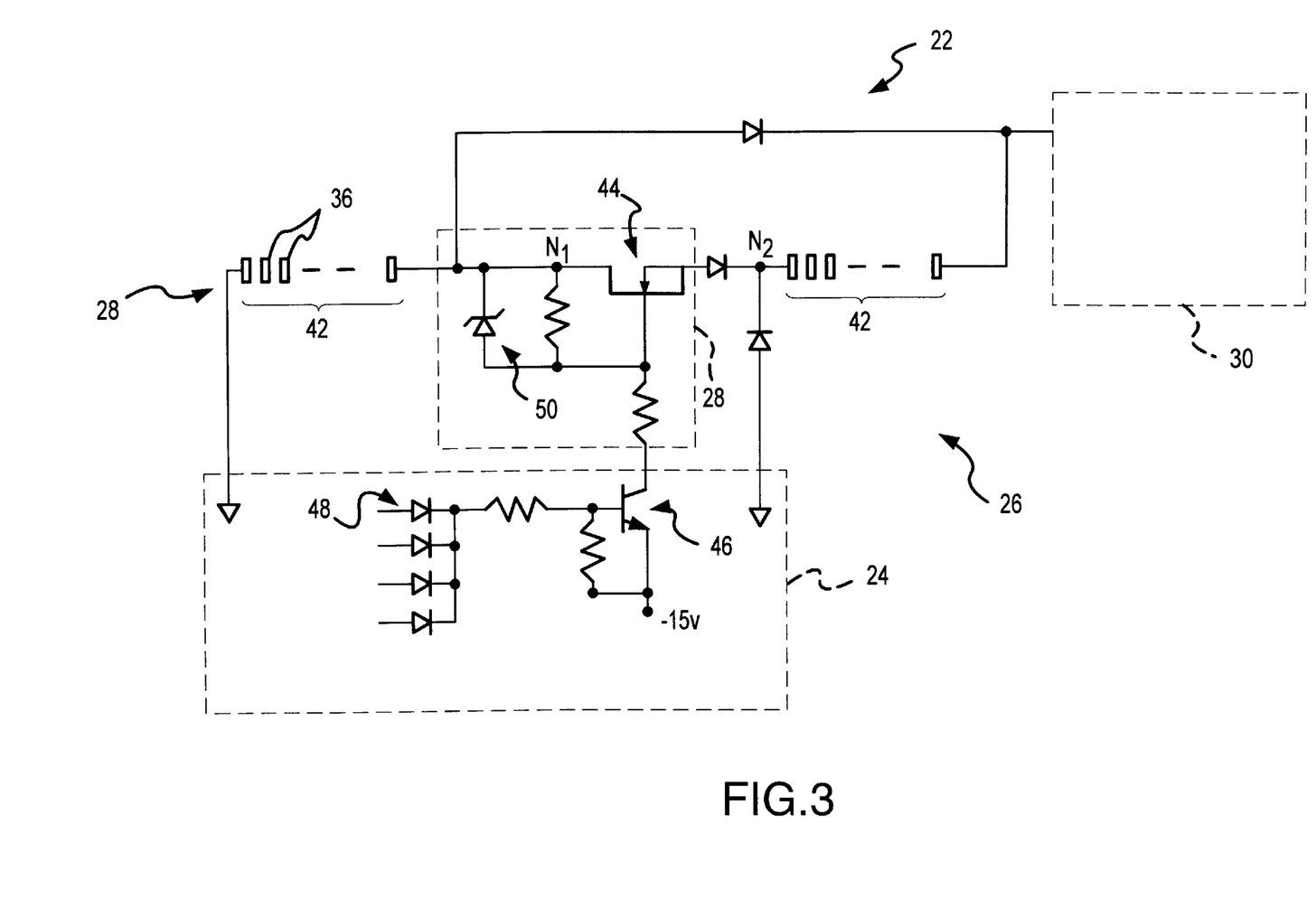
FIG. 3 is an electrical schematic diagram of the solar array switching unit of FIG. 2.

The present invention addresses these variations by providing a Solar Array Switching Unit ("SASU") that allows for variation of the solar cell string length and variation of the number of strings in parallel so as to diminish variations in overall current and voltage (and hence power) output over the course of a mission. One embodiment of the SASU 22 is illustrated in FIGS. 2 and 3. Generally, the SASU 22 includes a control system 24, a solar cell array 26, and switch circuits 28 (represented as relay switches in FIG. 2). The SASU is electrically interconnected to an external shunt power card 30.

The control system 24 controls operation of the switch circuits 28 to selectively configure the array 26 or portions thereof in a "long string" or "short string" configuration as will be understood upon consideration of the description below. Such configuration and reconfiguration may be conducted upon command, based on programmed instructions relating to mission requirements, or in response to sensed variations in the operating environment or power requirements (e.g., sensed current or voltage, temperature, etc.). In the illustrated embodiment, the array configuration can be controlled in response to commands from a ground-based command center. In this regard, the control system 24 includes a receiver 32, such as an antenna and related processing circuitry, for receiving commands, and control logic 34 for providing appropriate control signals for controlling operation of the switch circuits 28 in response to received commands.

The shunt power card 30 receives the electrical power output from the array 26 for powering computing, telemetry and other instrumentation of the spacecraft 10. The power card 30 is typically associated with storage devices and various circuit devices for providing appropriate signals to the spacecraft instrumentation.

The illustrated array 26 is generally a two-dimensional array of solar cells 36 arranged in rows 38 and columns 40.

Within each row 38 of the illustrated array 26 are two cell strings 42 separated by a switch circuit 28. Each string 42 includes a number of cells 36 interconnected in electrical series, without intervening switches or other circuit elements in the illustrated embodiment (e.g., the positive electrode of a cell 36 in the string 42 is integral with or directly connected to the negative electrode of a succeeding cell 36 in the string 42). For the purposes of the present description, the string length or number of cells 36 in a string 42, is represented by "X". The column length or number of rows within the array 26 is taken to be "0.5Y", for reasons that will become apparent. It will be appreciated that, although only two rows are shown in FIG. 2, many more rows may be, and typically will be, included in the array 26.

The switch circuits 28 of the various rows 38 may operate independently or in unison. In the illustrated embodiment, the switch circuits 28 operate in unison to provide only two array configurations, i.e., a long string configuration and a short string configuration. When the switch circuits 28 are closed, the string pairs of each row 38 are connected in series between a ground voltage, e.g., associated with the control system 24, and the power card 30. The array 26 is thus effectively configured as 0.5Y strings of 2X length in parallel. When the switch circuits 28 are open (as shown) the strings 42 of each row 38 are configured in parallel with one another between the ground voltage and power card 30, as well as in parallel with each of the strings 42 of each of the other rows 38. The array 26 is thus effectively configured as Y strings of X length in parallel.

The switch circuits 28 can be embodied as any suitable switch elements such as relay switches, MOSFET logic or the like. FIG. 3 shows a MOSFET based implementation for one switch circuit 28 of the array 26, together with a portion of the control system 24, for purposes of illustration. The illustrated switch circuit 28 includes a MOSFET device 44 disposed between the strings of 42 of a given row 28 as shown. The device 44 functions essentially as a switch to effectively connect or disconnect node $N_1$ and node $N_2$, depending on the bias voltage applied across device 44. The bias voltage is determined by operation of the transistor 46 in response to control signals transmitted via redundant control lines 48. In this regard, the signals transmitted via control lines 48 are digital in nature having a "0" state corresponding to a –15 v potential and a "1" state corresponding to a +15 v potential. The switch circuit 28, as illustrated, also includes an avalanche or zener diode 50 connected across MOSFET device 44 to protect the device 44. The diode 50, device 44 and related circuitry can be integrated circuit elements fabricated as an integral portion of the solar array panel. It will be appreciated that numerous alternative implementations of this parallel/series switching operation are possible.

The SASU 22 is readily scalable and can be designed to meet mission requirements without undue size, mass and expense. The associated design method may be understood by reference to the flow chart of FIG. 4 in conjunction with the exemplary mission as illustrated in FIG. 1. The process is initiated by selected (52) a solar technology from available choices. Competing technologies include, for example, SHARP High Efficiency Silicon Solar Cells, conventional silicon solar cells and GaAs cells. These options have differing efficiencies, temperature response curves, masses (per cell/panel) and costs. For the mission of FIG. 1, SHARP cells are selected because they have less mass, are cheaper and are more efficient at cold temperatures than GaAs cells, and because they perform better under low intensity-low temperature conditions than conventional silicon cells.

Figure 4:
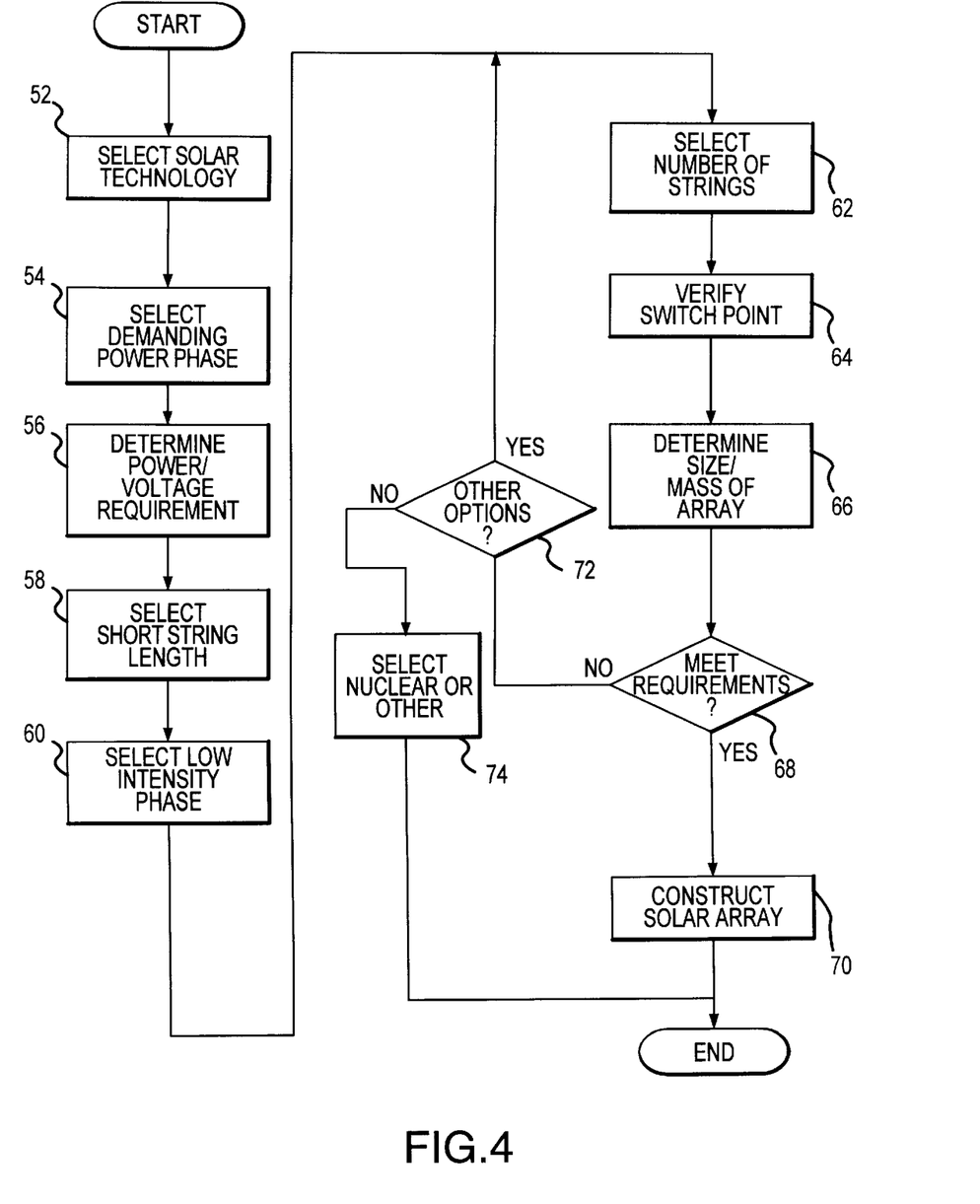
FIG. 4 is a flow chart illustrating a method for use in designing a solar array switching unit in accordance with the present invention.

The next series of steps relate to determining the short string length. It is anticipated that the short string configuration will best accommodate certain demanding power phases of the mission. In this regard, the short string length can be determined by selecting (54) a demanding power phase of the mission, determining (56) a power requirement and associated voltage for the selected phase, and selecting (58) a short string length for the selected phase. In the illustrated mission, a particularly demanding power phase will be upon encounter E at 1.86 AU where numerous spacecraft systems are up and running. The power demand at encounter is estimated to be about 300 watts. Based on the encounter power requirements as well as the performance characteristics of the selected cells at the encounter temperature and solar intensity, the short string cell length X can be determined. In this case, about 65 cells in series is found to provide the desired encounter voltage.

The next series of steps relates to determining the required number of strings Y. Because cell current decreases and voltage increases as distance from the sun increases, it is again anticipated that the short string configuration will best accommodate a low intensity phase of the mission far from the sun. Accordingly, determining the number of strings involves: selecting (60) a low intensity phase; and, based on the selected short string length and power requirements for the selected demanding current phase, selecting (62) the number of strings. In this case, the demanding current phase selected is an aphelion A point in the spacecraft's orbit where solar intensity is at a minimum. At this point, it is estimated that the cruise mode power requirements of the spacecraft will be about 170 watts. In order to meet this power requirement, given the string length X of 65 cells, it is determined that approximately 42 strings (Y=42) are required, corresponding to about 21 rows of string pairs.

The short string length X determines the switching point as between the short string and long string configuration. For the illustrated mission, the adequacy of the long string configuration for all portions of the mission on the sun side of encounter E, and the adequacy of short string configuration for all points in the opposite side of the mission, is readily verified (64). In this regard, the power requirements during all such portions of the mission, other than during encounter, will be approximately the cruise mode power requirement of 170 watts. Based on the known cell current and voltage at encounter, it can be readily verified that the long string configuration meets this cruise mode power requirement. It is thus apparent that the long string configuration will be adequate for the sun side of the mission (spacecraft/sun distance <1.86 AU) because solar flux is greater than encounter. Similarly, the short string configuration will be adequate for all points on the opposite side of the spacecraft's orbit (spacecraft/sun distance >1.86 AU) because the solar flux at all such points is at least as great as the aphelion A.

Once the required values of X and Y are known, the size and mass of the array (as well as the approximate cost) can be readily determined (66) and compared (68) to mission requirements or limitations. If the limitations are met by the required array, then the design is acceptable and the array can be constructed (70). On the other hand, if such limitations are exceeded, e.g., if the required mass is more than specified for the mission, other solar cell technologies may be considered and the process is repeated. If all such options are exhausted (72) without finding an acceptable design, then it may be necessary to select (74) an alternative power source for the mission such as a nuclear system. Remarkably, the SASU for the illustrated mission is estimated to require only 6.7 m² of active cell area and have a mass of only about 1.3–1.7 kg including associated circuitry.

Figure 5:
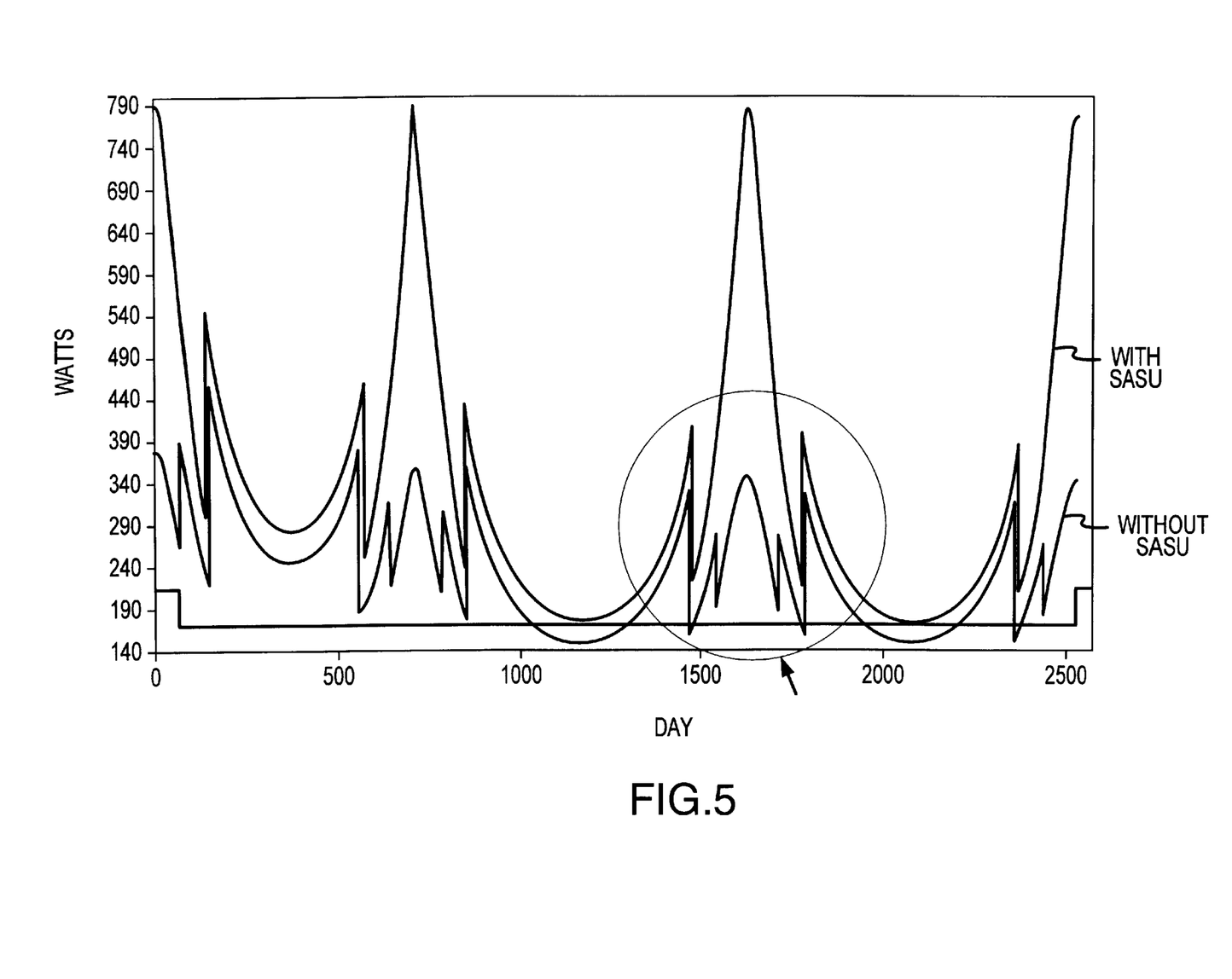
FIG. 5 is a graph showing a performance comparison, for a particular deep space mission, between a conventional solar array and an array according to the present invention.

The advantages of the SASU of the present invention are graphically illustrated in FIG. 5 which shows theoretically derived power production curves, with and without the SASU, over multiple revolutions of the orbit shown in FIG. 1. In particular, FIG. 5 shows that the minimum power outputs, as observed in the circles area of the graph, are increased by about 80 watts by using the SASU. It will therefore be appreciated that the SASU will allow solar power to be used in certain missions where a nuclear system might otherwise be thought necessary, and allows for use of inexpensive and lightweight solar technology options which might not otherwise be acceptable for certain missions. In addition, the SASU provides more power for a given panel area, reduces power "dips" that occur in conventional panels due to cells becoming inactive due to under voltage, and reduces total power loss in the event that any one string is lost. The stringing is also uncomplicated as all strings can be the same length. Other advantages will be apparent to those skilled in the art.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A solar power system for a spacecraft, comprising:
   a) a solar array including:
      i) a first cell string including a first number of first solar cells arranged in series free from any intervening switch element interposed between any two of said first solar cells;
      ii) a second cell string including a second number of second solar cells arranged in series free from any intervening switch element interposed between any two of said second solar cells;
      iii) a third cell string including a third number of third solar cells arranged in series free from any intervening switch element interposed between any two of said third solar cells; and
      iv) a fourth cell string including a third number of third solar cells arranged in series free from any intervening switch element interposed between any two of said third solar cells; and
   b) configuration means for switching said solar array between a first configuration wherein said first string is arranged in parallel with each of said second, third and fourth strings, and a second configuration wherein said first string is in series with one of said second, third and fourth strings.

2. A solar power system as set forth in claim 1, wherein said first and second strings are arranged in a first row of the array and said third and fourth strings are arranged in a second row of said array.

3. A solar power system as set forth in claim 1, wherein each of said first, second, third and fourth strings has approximately the same number of cells.

4. A solar power system as set forth in claim 1, wherein said array is formed from a number of string pairs, each of said pairs including two strings arranged in a single row of said array, wherein each of said pairs defines a short string length and a long string length.

5. A solar power system as set forth in claim 1, wherein each of said strings includes a plurality of silicon containing solar cells.

6. A solar power system as set forth in claim 1, wherein said configuration means comprises a switch disposed between said first string and said one of said second, third and fourth strings.

7. A solar power system as set forth in claim 6, wherein said switch comprises one of a relay switch and logic circuitry.

8. A solar power system as set forth in claim 1, wherein said array is formed from a number of string pairs, each of said pairs including two strings arranged in a single row of said array, and said configuration means comprises a switch disposed between said two strings in each said row.

9. A solar power system as set forth in claim 1, wherein said array includes a first number of strings including said first, second, third and fourth strings, and said configuration means comprises a first number of switches, said first number of strings being greater than said first number of switches.

10. A solar power system as set forth in claim 9, wherein said first number is at least twice as great as said second number.

11. A solar power system as set forth in claim 1, wherein said array includes a number of strings including said first, second, third and fourth strings and said configuration means comprises means for switching said array between a first grouping wherein said number of strings is arranged as a first plurality of groups and a second grouping wherein said number of strings is arranged as a second plurality of groups, each said group of said first and second pluralities including at least two strings interconnected in electrical series, said first plurality including at least twice as many groups as said second plurality.

12. A solar power system as set forth in claim 1, further comprising a control system for controlling operation of said configuration means.

13. A solar power system as set forth in claim 12, wherein said control system comprises means for receiving commands from a command center separate from said spacecraft.

14. A solar power system as set forth in claim 1, wherein said power system further comprises means for receiving an output from said array so that said output can be used in powering other systems of said spacecraft.

15. A solar power system for a spacecraft, comprising:
   a solar cell array; and
   a configuration means for switching said solar cell array between a first configuration and a second configuration, wherein in said first configuration said solar cell array has at least twice as many cell strings as in said second configuration, where each of said cell strings includes a number of solar cells arranged in series and each of said cell strings in each of the first configuration and second configuration is arranged in parallel with each other of said cell strings.

16. A solar power system as set forth in claim 15, wherein said array is formed from a number of string pairs, each of said pairs comprising two strings arranged in a single row of said array.

17. A solar power system as set forth in claim 15, wherein said configuration means comprises a first plurality of switches, wherein a number of switches of said first plurality of switches is less than a number of cell strings in said solar cell array in said first configuration.

18. A solar power system as set forth in claim 17, wherein a number of cell strings of said first configuration is at least about twice said number of switches of said first plurality of switches.

19. A solar power system as set forth in claim 15, further comprising a control system for receiving commands from a command center separate from said spacecraft and controlling operation of said configuration means in response to said received commands.

20. A solar power system for a spacecraft, comprising:

a solar cell array; and configuration means for switching said solar cell array between a first configuration wherein said array includes a first plurality of cell strings arranged in parallel and a second configuration wherein said array includes a second plurality of cell strings arranged in parallel, said second plurality having more of said strings arranged in parallel than said first plurality, each of said strings of said first and second plurality including a number of solar cells arranged in series;

said configuration means comprising a first plurality of switches for use in switching said array between said first configuration and said second configuration, wherein a number of said switches of said first plurality of switches is less than a number of said strings of said second plurality of cell strings.

21. A solar power system as set forth in claim 20, wherein each of said strings of said first and second pluralities includes a number of cells arranged in series free from intervening switch elements between any two cells of said number of cells.

22. A solar power system as set forth in claim 20, wherein said number of strings of said second plurality of cell strings is at least twice said number of switches of said first plurality of switches.

23. A solar power system as set forth in claim 20, wherein said second plurality has at least about twice as many strings arranged in parallel as said first plurality.

24. A solar power system as set forth in claim 20, further comprising a control system for receiving commands from a command center separate from said spacecraft and controlling operation of said configuration means in response to said received commands.

25. A method for use in designing a solar power system for a space mission, said solar power system including:

a configurable solar cell array formed from strings, of solar cells arranged in series where the strings have a variable cell string length and can be arranged in a variable parallel arrangement of strings, said variable string length being variable between a first string length including a first number of cells arranged in series and a second string length including a second number of cells arranged in series, said second number of cells of said second string length being greater than said first number of cells of said first string length, said variable parallel arrangement of strings being variable between a first parallel arrangement wherein said solar cell array includes a first number of strings arranged in parallel and a second parallel arrangement wherein said solar cell array includes a second number of strings arranged in parallel, said second number of strings of said second parallel arrangement being greater than said first number of strings of said first parallel arrangement, said method comprising steps of:

determining said first string length to provide an electrical output; and based on said selected first string length, and also based on a solar intensity, determining said second, parallel arrangement of strings.

26. A method as set forth in claim 25, wherein said step of determining said first string length comprises determining a value of a power requirement, and determining said first number of strings of said first string length based on said power value.

27. A method as set forth in claim 25, wherein said step of determining said first string length comprises determining a voltage requirement, and determining said first string length based on said voltage requirement and cell voltage. cell voltage.

28. A method as set forth in claim 25, further comprising the step of arranging said solar cell array so as to include a plurality of cell groups wherein each cell group includes at least two strings disposed in a collinear relationship.

* * * * *